S. Oppenheimer.
Hand Saw Frame.

Nº 67,343. Patented July 30, 1867.

Witnesses:
John S. Keller
Thomas Chapman.

Inventor:
Solomon Oppenheimer

United States Patent Office.

SOLOMON OPPENHEIMER, OF PERU, INDIANA.

Letters Patent No. 67,343, dated July 30, 1867.

---

IMPROVEMENT IN BUCK-SAW FRAMES.

---

The Schedule referred to in these Letters Patent and making part of the same.

---

TO ALL WHOM IT MAY CONCERN:

Be it known that I, SOLOMON OPPENHEIMER, of Peru, Miami county, and State of Indiana, have invented a new and improved Mode of Attaching the Blades to the Frames of the Common Buck-Saws; and I hereby declare that the following is a full and exact description thereof, reference being had to the accompanying drawings, and to the letters of reference marked thereon.

Figure 1:
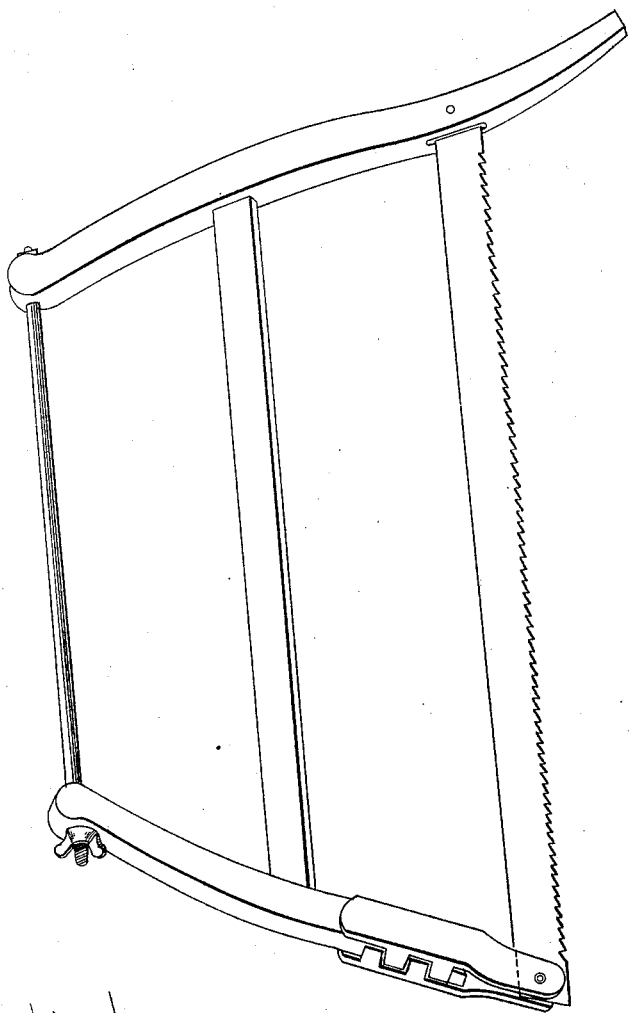
Figure 3:
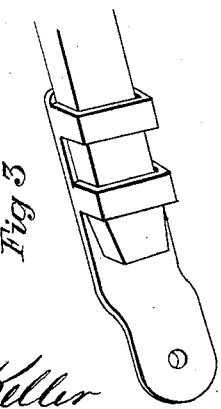
Figure 2:
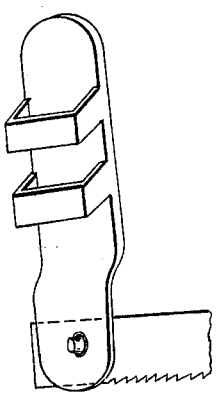

The object of my improvement is to provide a more firm and durable fastening for the saw-blade at the butt end of the outer frame-piece, in place of a simple cleft cut into the wood, and which object I accomplish by cutting off so much of the frame-piece as has the cleft in it, and an inch or two more, and in place of the piece thus removed I attach a pair of metallic straps, having loops for that purpose, to the stump of the frame-piece. Figures 2 and 3 represent such a pair of straps. One of these straps, fig. 2, has a pin permanently affixed on its lower end, which is to hold the saw-blade. The other strap has a hole corresponding and to fit the pin when laid over it; the saw-blade is being clamped between them and held fast by the pin. These two straps when thus united, and their loops locking into each, form of their upper parts a socket which is to be driven or slipped on the stump of the frame-piece, as it is plainly shown at Figure 1 complete and ready for use. At Figure 3 can be seen how the stump is connected to the straps. If desired, the two straps can be cast in one piece, making an unbroken socket, but I consider it more handy and convenient when in parts, and in the manner shown.

What I claim as my invention, and desire to secure by Letters Patent, is—

The above-described attachment to the saw-frames, or its equivalent, when used and applied for the purpose and in the manner shown and explained.

SOLOMON OPPENHEIMER.

Witnesses:
    J. S. KELLER,
    THOMAS CHAPMAN.